F. V. POLAKOSKEY.
TROLLEY GUARD.
APPLICATION FILED MAR. 17, 1909.
932,998.
Patented Aug. 31, 1909.
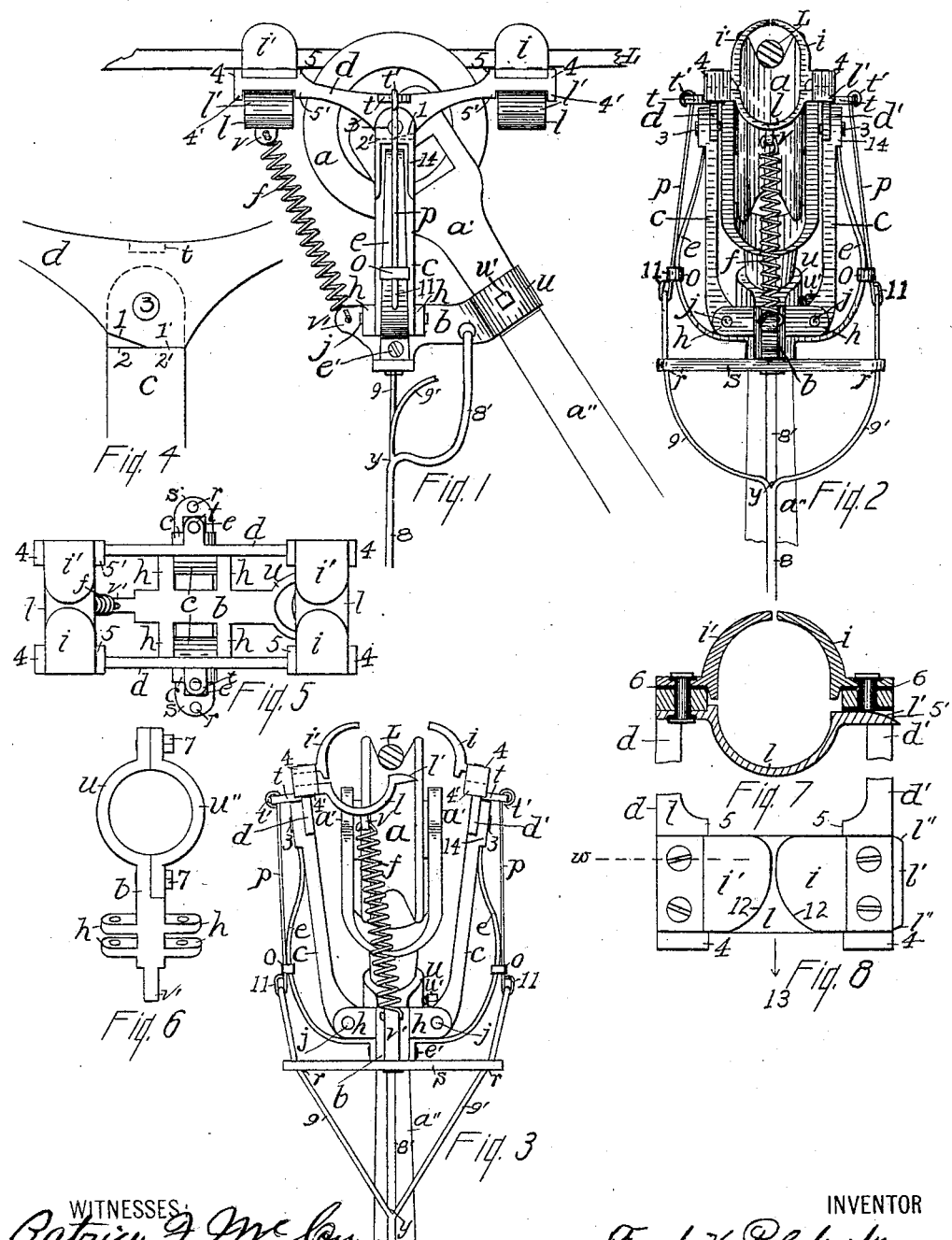
WITNESSES:
INVENTOR
Frank V. Polakoskey
BY
ATTORNEY

UNITED STATES PATENT OFFICE.

FRANK V. POLAKOSKEY, OF PEEKSKILL, NEW YORK, ASSIGNOR OF ONE-THIRD TO P. W. O'BRIEN AND ONE-THIRD TO THOMAS McPHILLIPS, BOTH OF PEEKSKILL, NEW YORK.

TROLLEY-GUARD.

932,998.      Specification of Letters Patent.     Patented Aug, 31, 1909.

Application filed March 17, 1909. Serial No. 483,950.

*To all whom it may concern:*

Be it known that I, FRANK V. POLAKOSKEY, a citizen of the United States, and resident of Peekskill, in the county of Westchester and State of New York, have invented certain new and useful Improvements in Trolley-Guards, of which the following is a specification.

This invention relates to trolley wheels, and has for its object a means to prevent the trolley from automatically separating from the line wire. The object is attained by the means set forth in these specifications and the accompanying drawings, in which like characters refer to similar parts throughout the several views.

Figure 1 is a side elevation of a trolley wheel with the guard attachment applied thereto. Fig. 2 is an elevation viewing Fig. 1 from the left hand side. Fig. 3 is an elevation similar to Fig. 2 showing the guards separated to admit of shifting the trolley wheel from the line. Fig. 4 is a detail relating to a rocking arm. Fig. 5 is a plan of the guards apart from the trolley pole. Fig. 6 is the clamp support for the guards. Fig. 7 represents one of the guards in transverse section. Fig. 8 is an enlarged plan of one set of the guards.

This trolley wheel guard is adapted for application to trolley wheels in use, as well as those in process of construction. Fig. 1 shows the device placed on the shank $a'$ of the trolley wheel yoke, and as secured thereto by a set screw $u'$. The guard comprises a bracket $b$, side swinging levers $c$, and horizontal arms $d$ that carry guards $i'$ $i'$ and $l$ $l$. Springs $p$ and $f$ operate to keep the guards in a normal position.

The bracket $b$ is shown in plan in Fig. 6, and as modified from that shown in Fig. 1, in that the part $u$ which embraces the trolley yoke, is adapted to be clamped to the yoke instead of being held by a set-screw, as in Figs. 1 and 3, the part $u$ comprising a separable piece $u''$ that is secured in place by bolts 7 7. The bracket has lugs $h$ $h$, shown in Figs. 1 2 3 5 6, on opposite sides to which vertical levers $c$ $c$ are hinged by means of pins $j$. Springs $e$ $e$ secured to the bracket below the lugs, by screws $e'$, curve upward and by contact with the upper ends of the levers press the levers toward each other. The upper ends of the two springs lie in recesses formed by flanges 14 around the ends of the levers. The normal positions of these several parts are clearly shown in Fig. 2, in which the levers are shown pivoted at $j$ $j$.

Horizontal arms $d$ $d'$ are pivoted to the upper ends of the levers $c$ $c$, shown in all the figures except 6 7 8. The levers are pivoted at 3, Figs. 1 2 4, and are allowed a certain amount of rocking movement, as shown in Fig. 4, in which the parts are viewed from the sides next the trolley wheel. In one direction shoulders 1' on the arm and 2' on the lever limit movement in one direction, while movement in the other direction is limited by the amount of space between the surfaces 1 on the arm and 2 on the lever. This allowance for movement is also shown by broken lines at 1 2' Fig. 1. A spiral spring $f$, Figs. 1 2 3 holds the arms normally as shown in Fig. 1, the upper end of the spring having a connection with the guard $l$ at $v$, the lower end hooked to a lug $v'$ in the bracket $b$. The object of the allowance of movement is to admit of some self adjustment horizontally by the guard arms.

The outer ends of the arms $d$ $d'$, shown in all the figures except 4 and 6, are notched on the tops transversely, leaving flanges 4 5 on the tops and 4' 5' on the bottoms of the arms. In the top notches flanged ends of curved guard pieces $i'$ $i$ are secured, and the guards approach each other to form an arch over the line wire when closed, as clearly shown in Fig. 2. The notches on the under side of one of the arms, as $d'$, Figs. 1 2 3 7 carry guards $l$ $l$ which are adapted to reach to the under notches in the opposite arm $d$ when the arms are closed, as in Fig. 2, so that when closed the united arms form an inclosure around the line wire L. The extreme ends of the guards $l$ $l$ are curved as at $l'$ to admit of their readily entering their respective notches.

As shown in Fig. 2 it will be apparent that the lower guards $l$ $l$ are not liable to contact with the line wire. The upper guards are insulated from their supports in a manner shown in Fig. 7 when insulation is represented at 6 6. Fig. 7 is a cross section of the guards through line $w$, Fig. 8. In order that the guards $i'$ $i$ may readily pass line hangers they are given free curves as at 12 12 on the ends toward the direction of their travel, as per the arrow 13 in Fig. 8. This figure also shows that the corners are rounded off the tips of the points $l'$ of the guard $l$ to facilitate their entrance in the notches provided for the guards.

At the middle of the rocker arms, on their outer sides, are lugs $t\ t$ into which links $p\ p$ are looped, as at $t'\ t'$ Figs. 1 2 3. These links lie against the springs $e\ e$, and where they come in contact with the springs are kept in place by bands $o\ o$, Figs. 1 2 3, which encircle the springs and links. The lower ends of the links are looped as at 11 11 and at a convenient point to prevent the bands $o\ o$ from dropping so low as to bind the springs and links together. Cords 9 9′, Figs. 2, 3, are connected to the loops 11 11, and the cords unite with the trolley pole line 8, as in Figs. 1 2, in a manner that when the pole line is pulled the short lines will open the guards before moving the pole, as in Fig. 3. The guard lines pass through the ends $r\ r$ of the bracket $s$, as in Figs. 2 3 5, the bracket being secured to the part $b$. In Fig. 1 the line 9′ is shown as broken away from the link connection.

Reference to Fig. 2 will clearly show that when the guards are closed above the line wire L, against which the wheel $a$ travels, no ordinary force could cause the wheel to leave the line, the springs $e\ e$ being of a strength to resist the forces usually brought to bear to produce that separation. Fig. 3 shows how the guards yield to a pull on the trolley rope, and leave the line wire free, when it is necessary to manipulate the pole $a''$.

Having described my invention, what I claim and desire to secure by Letters Patent, is—

1. In a trolley wheel guard the combination with a trolley wheel of a bracket secured to the trolley staff, vertical levers hinged to the bracket on each side of the trolley wheel, springs upon the vertical levers to keep them closed, rocker-arms on the ends of the vertical levers parallel with the line wire, guards fixed to both ends of the rocker arms arching and meeting above the line before and behind the wheel, reversely arched guards fixed to the ends of one rocker-arm below the upper guards one end of the lower guards lodging within slots in the under ends of the opposite rocker-arm the rocker arms having a limited rocking motion, a spring to keep the rocker arms in a normal position, and means for separating the guards comprising links suspended from the rocker-arms, rings for retaining said links in position, and operative cords attached to the links and extending through brackets extended from the main bracket, the cords united to and operative in unison with the trolley pole line.

2. In a trolley guard the combination with a trolley wheel of a pole supported bracket, side levers pivoted to the said bracket, rocker-arms on the ends of said levers adapted to lie parallel with a line wire, guards on the ends of said arms, the opposite guards held together by springs against the side levers, the guards separable by means of lines attached to the side levers and the trolley pole line.

Signed at Peekskill in the county of Westchester and State of New York this first day of March A. D. 1909.

FRANK V. POLAKOSKEY.

Witnesses:
E. J. HORTON,
ALLEN BARGER.